(12) United States Patent
McGranahan et al.

(10) Patent No.: US 11,169,048 B2
(45) Date of Patent: Nov. 9, 2021

(54) WIND TUNNEL STING, WIND TUNNEL STING DAMPER, AND METHOD THEREFOR

(71) Applicant: The Boeing Company, Chicago, IL (US)

(72) Inventors: Bryan D. McGranahan, O'Fallon, MO (US); Mathew L. Rueger, Edwardsville, IL (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 16/571,418

(22) Filed: Sep. 16, 2019

(65) Prior Publication Data
US 2021/0080345 A1   Mar. 18, 2021

(51) Int. Cl.
*G01M 9/00* (2006.01)
*G01M 9/06* (2006.01)
(Continued)

(52) U.S. Cl.
CPC .......... *G01M 9/062* (2013.01); *F16F 7/1017* (2013.01); *G01M 9/08* (2013.01)

(58) Field of Classification Search
CPC .......... G01M 9/04; G01M 9/02; G01M 9/062; G01M 9/06; G01M 9/065; G01M 9/08; G01M 17/007; G01M 17/0074; G01M 9/067; G01M 10/00; G01M 15/14; G01M 17/0072; G01M 13/027; G01M 17/0076; G01N 15/02; G01N 15/0205; G01N 25/02; G01N 33/28; G01N 11/02; G01N 13/00; G01N 15/10; G01N 19/02; G01N 2011/0093; G01N 2015/1062; B64D 23/00; B64D 15/20; B64D 2045/0085;
(Continued)

(56) References Cited

U.S. PATENT DOCUMENTS

| 2,906,119 A | * | 9/1959 | Montgomery | ........ G01M 9/062 73/147 |
| 3,554,028 A | * | 1/1971 | Horanoff | ............... G01M 9/062 73/147 |

(Continued)

FOREIGN PATENT DOCUMENTS

EP   1319863 A1 * 6/2003 ............. B64D 43/02

OTHER PUBLICATIONS

Glaese et al., "Reduction of Dynamic Response of a Wind Tunnel Sting Mount Using a Hub Damper Unit", 48th AIAA Aerospace Sciences Meeting Including the New Horizons Forum and Aerospace Exposition, Jan. 4-7, 2010, Orlando, Florida.
(Continued)

*Primary Examiner* — Andre J Allen
(74) *Attorney, Agent, or Firm* — Perman & Green, LLP

(57) ABSTRACT

A wind tunnel sting comprising a support member and a wind tunnel sting damper. The support member having a first support-member end configured for coupling with a wind tunnel, and a second support-member end configured for coupling with a balance. The wind tunnel sting damper having a reactive member, and a viscoelastic member disposed between the reactive member and the support member wherein, the reactive member is sized relative to the support member so as to radially compress the viscoelastic member against the support member.

20 Claims, 8 Drawing Sheets

(51) Int. Cl.
*G01M 9/04* (2006.01)
*G01M 9/08* (2006.01)
*F16F 7/10* (2006.01)

(58) Field of Classification Search
CPC .... B64D 43/00; B64D 43/02; B64D 45/0005; B64D 47/08
USPC .......................................................... 73/147
See application file for complete search history.

(56) References Cited

U.S. PATENT DOCUMENTS

| | | | | |
|---|---|---|---|---|
| 3,572,112 | A * | 3/1971 | Igoe | G01M 9/04 |
| | | | | 73/147 |
| 3,587,306 | A * | 6/1971 | Bryan | F16F 9/04 |
| | | | | 73/147 |
| 4,938,058 | A * | 7/1990 | Girard | G01M 9/04 |
| | | | | 73/147 |
| 5,644,075 | A * | 7/1997 | Hefer | G01M 9/04 |
| | | | | 310/328 |
| 9,541,149 | B2 | 1/2017 | McGranahan et al. | |
| 10,060,823 | B2 | 8/2018 | McGranahan | |
| 10,309,867 | B2 | 6/2019 | Hovik et al. | |
| 2003/0177825 | A1 | 9/2003 | Gibson | |
| 2006/0096364 | A1* | 5/2006 | Carlson | G01M 9/06 |
| | | | | 73/170.01 |
| 2018/0045600 | A1* | 2/2018 | Hovik | G01M 9/04 |
| 2018/0156689 | A1 | 6/2018 | McGranahan | |

OTHER PUBLICATIONS

Hsu et al., "Reduction of Dynamic Response of a Wind Tunnel Sting Mount Using a Hub Damper Unit", 48th AIAA Aerospace Sciences Meeting Including the New Horizons Forum and Aerospace Exposition, Jan. 4-7, 2010, Orlando, Florida.

Meng et al., "Research on vibration suppression of wind turbine blade based on bamboo wall three-layer damping structure", Journal of Vibroengineering, Feb. 2017, vol. 19, Issue 1.

* cited by examiner

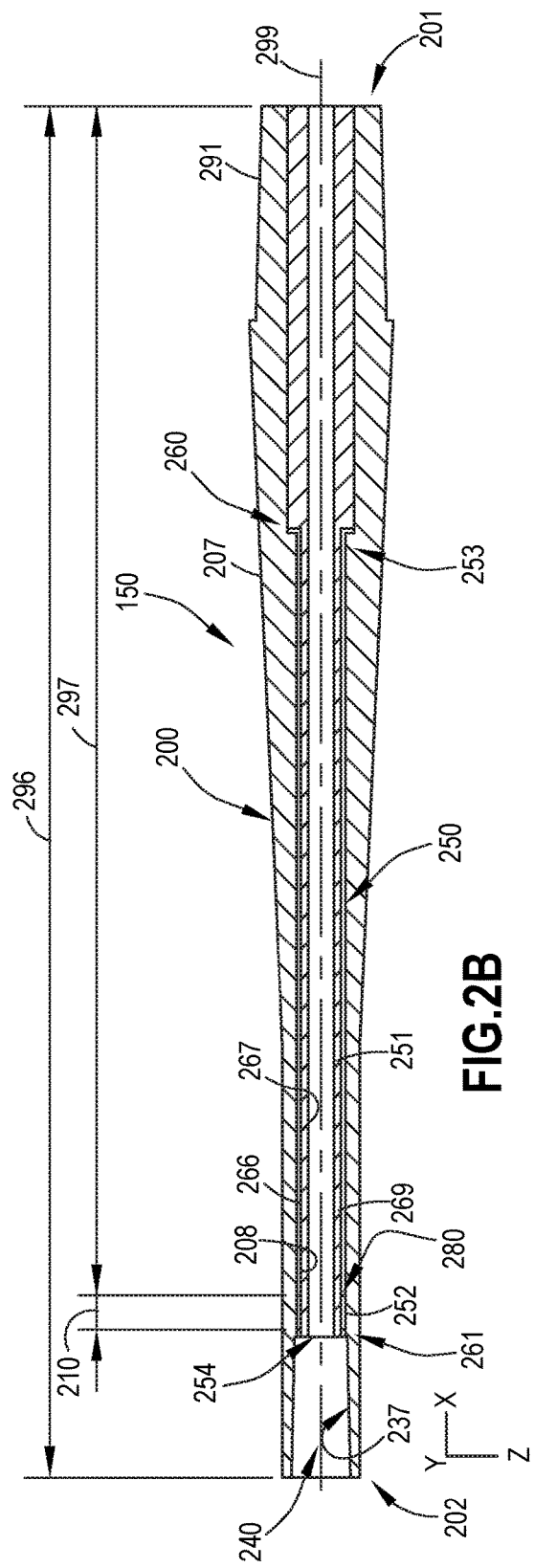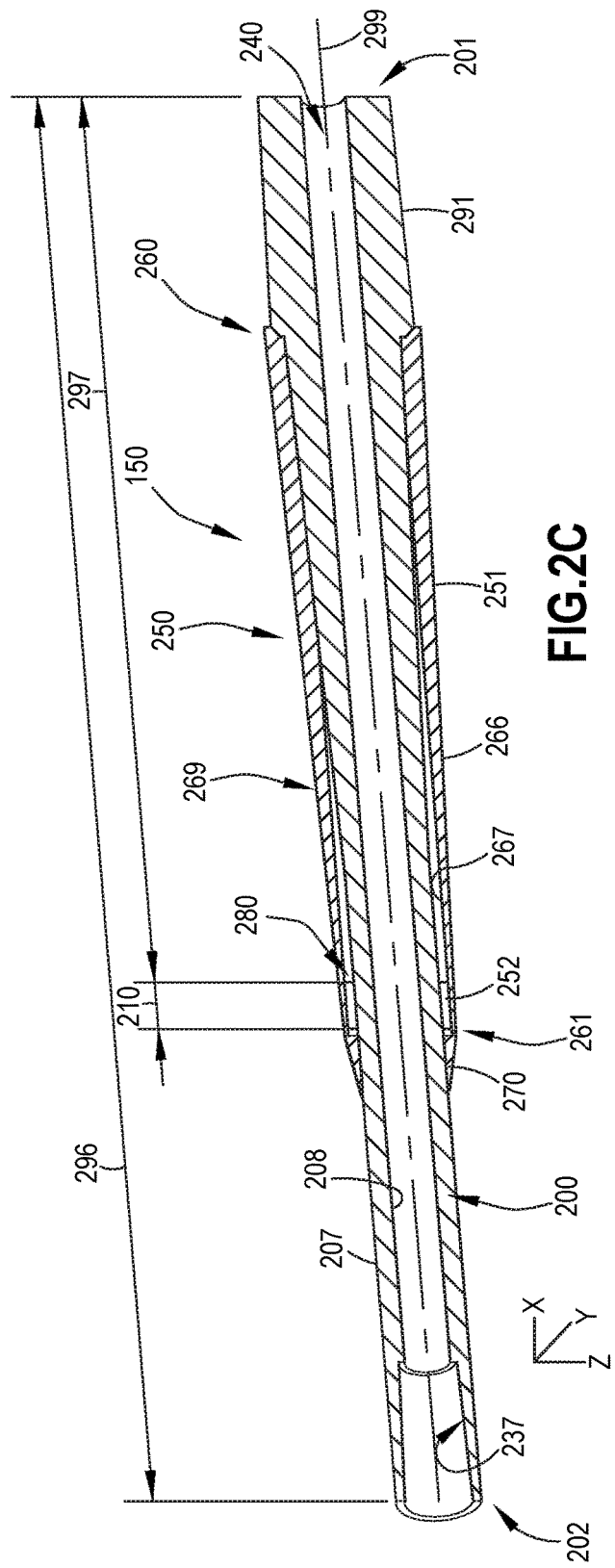

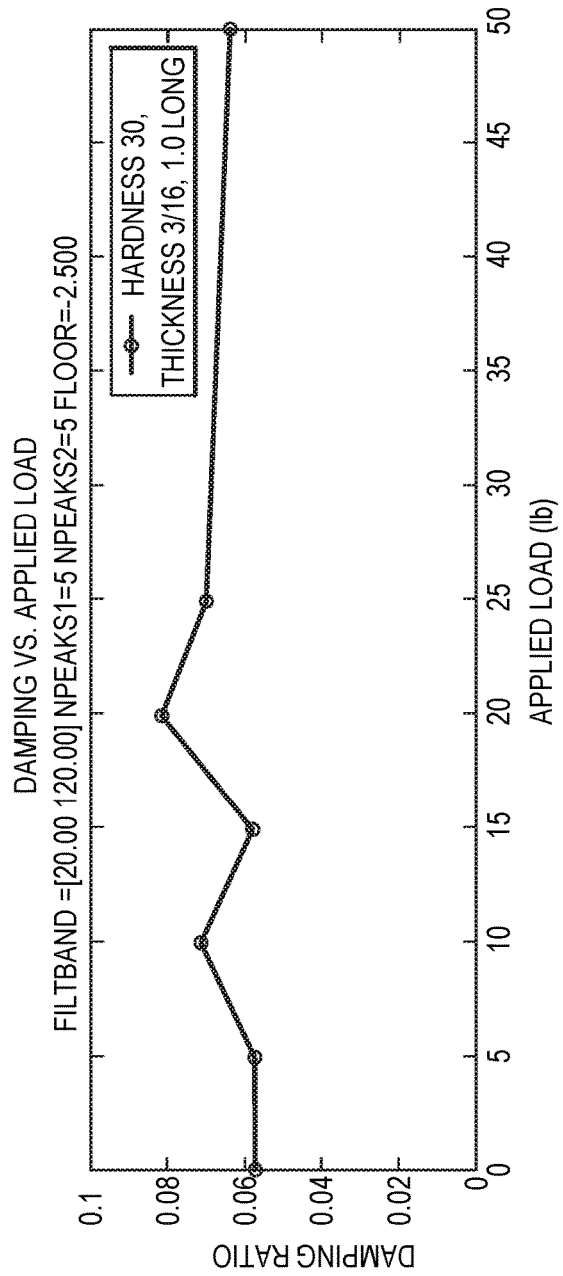
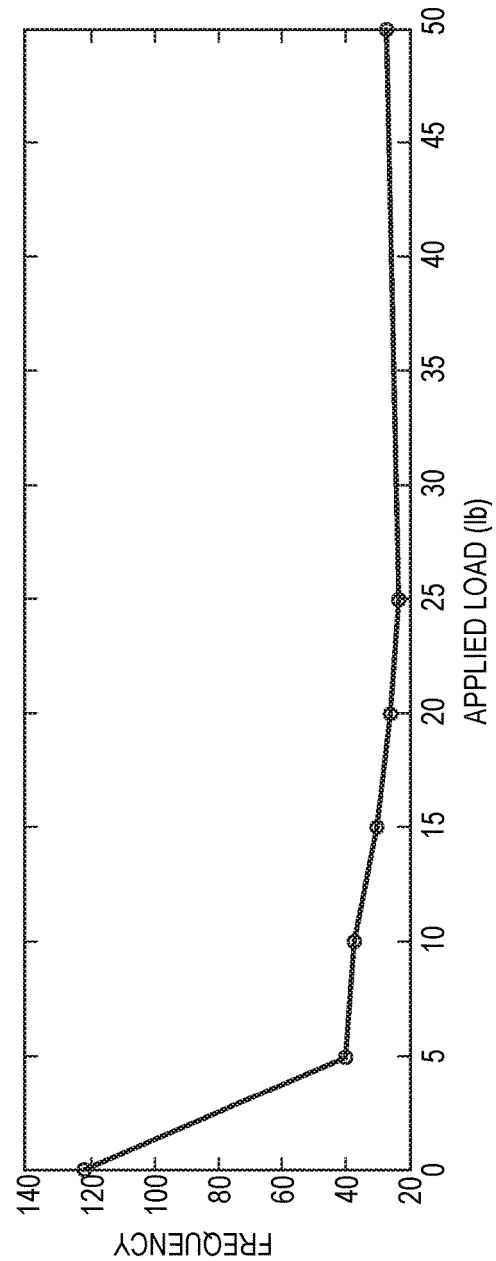

WIND TUNNEL STING, WIND TUNNEL STING DAMPER, AND METHOD THEREFOR

BACKGROUND

1. Field

The exemplary embodiments generally relate to aerodynamic stings and particularly to aerodynamic stings for wind tunnel testing.

2. Brief Description of Related Developments

Wind tunnel models are routinely subjected to dynamic loading as a result of coupling between a wind tunnel model support system and unsteady aerodynamic loads. The dynamic loading of the wind tunnel models may create vibrations that impact the ability to perform wind tunnel testing. For example, the dynamic loading of the wind tunnel model and the unsteady aerodynamic loads may impose limits in an operation envelope (e.g., limits on air speed, etc.) of wind tunnel testing.

Conventional techniques for mitigating the vibration inducing unsteady dynamic loads on the wind tunnel models include reducing wind tunnel dynamic pressure, building extra stiffness into the wind tunnel model support system, and limiting the test envelope of the wind tunnel model to avoid areas of unsteady aerodynamic phenomena. However, reducing wind tunnel dynamic pressure has the disadvantage of increasing the chance of scale effects into the wind tunnel data, and only pressurized wind tunnels have the capability to reduce dynamic pressure independent of Mach number. Increasing the stiffness of the wind tunnel model support generally involves increasing the wind tunnel balance capacity and increasing a diameter of the wind tunnel sting to which the wind tunnel balance and model are mounted. The increase in wind tunnel balance capacity and the increase in wind tunnel sting diameter generally lead to compromises in data quality due to increased model distortion and decreased balance sensitivity. Avoiding test conditions affected by unsteady aerodynamics is undesirable as regions of unsteady aerodynamics may be of interest to the end users of the wind tunnel data.

Tuned mass dampers have also been shown to be successful at reducing wind tunnel model dynamics, but not all wind tunnel models have adequate space to accommodate the tuned dampers, and the tuned dampers generally act only in a single direction (i.e., in and along a single spatial axis). Actuators have also been added to the wind tunnel stings to actively control the vibrations in the wind tunnel sting in an attempt to counteract dynamic motion of the wind tunnel model; however, these active systems are expensive and complicated and generally rely on expertise of wind tunnel operators to be effective.

SUMMARY

Accordingly, apparatuses and methods intended to address, at least, the above-identified concerns would find utility.

The following is a non-exhaustive list of examples, which may or may not be claimed, of the subject matter according to the present disclosure.

One example of the subject matter according to the present disclosure relates to a wind tunnel sting comprising a support member and a wind tunnel sting damper. The support member having a first support-member end configured for coupling with a wind tunnel, and a second support-member end configured for coupling with a balance. The wind tunnel sting damper having a reactive member, and a viscoelastic member disposed between the reactive member and the support member wherein, the reactive member is sized relative to the support member so as to radially compress the viscoelastic member against the support member.

Another example of the subject matter according to the present disclosure relates to a wind tunnel sting damper comprising: a reactive member that is shaped and sized to as to be coupled with a wind tunnel sting where, the reactive member extends along a longitudinal axis of the wind tunnel sting, and a viscoelastic member disposed between the reactive member and the wind tunnel sting; wherein, the reactive member is sized relative to the wind tunnel sting so as to radially compress the viscoelastic member against the wind tunnel sting so as to generate shear forces at an interface between the viscoelastic member and the wind tunnel sting and at the interface between the viscoelastic member and the reactive member, where the shear forces counter relative movement between the reactive member and the wind tunnel sting to effect vibrational damping of the wind tunnel sting.

Still another example of the subject matter according to the present disclosure relates to a method of dampening vibrations of a wind tunnel sting, the method comprising: exciting the wind tunnel sting so as to induce vibration of a free end of the wind tunnel sting; damping the induced vibration with a wind tunnel sting damper that includes a reactive member that is shaped and sized to as to be coupled with a wind tunnel sting where, the reactive member extends along a longitudinal axis of the wind tunnel sting, and a viscoelastic member disposed between the reactive member and the wind tunnel sting; wherein, the reactive member radially compresses the viscoelastic member against the wind tunnel sting so as to generate shear forces at an interface between the viscoelastic member and the wind tunnel sting and at the interface between the viscoelastic member and the reactive member, where the shear forces counter relative movement between the reactive member and the wind tunnel sting to effect vibrational damping of the wind tunnel sting.

BRIEF DESCRIPTION OF THE DRAWINGS

Figure 1:
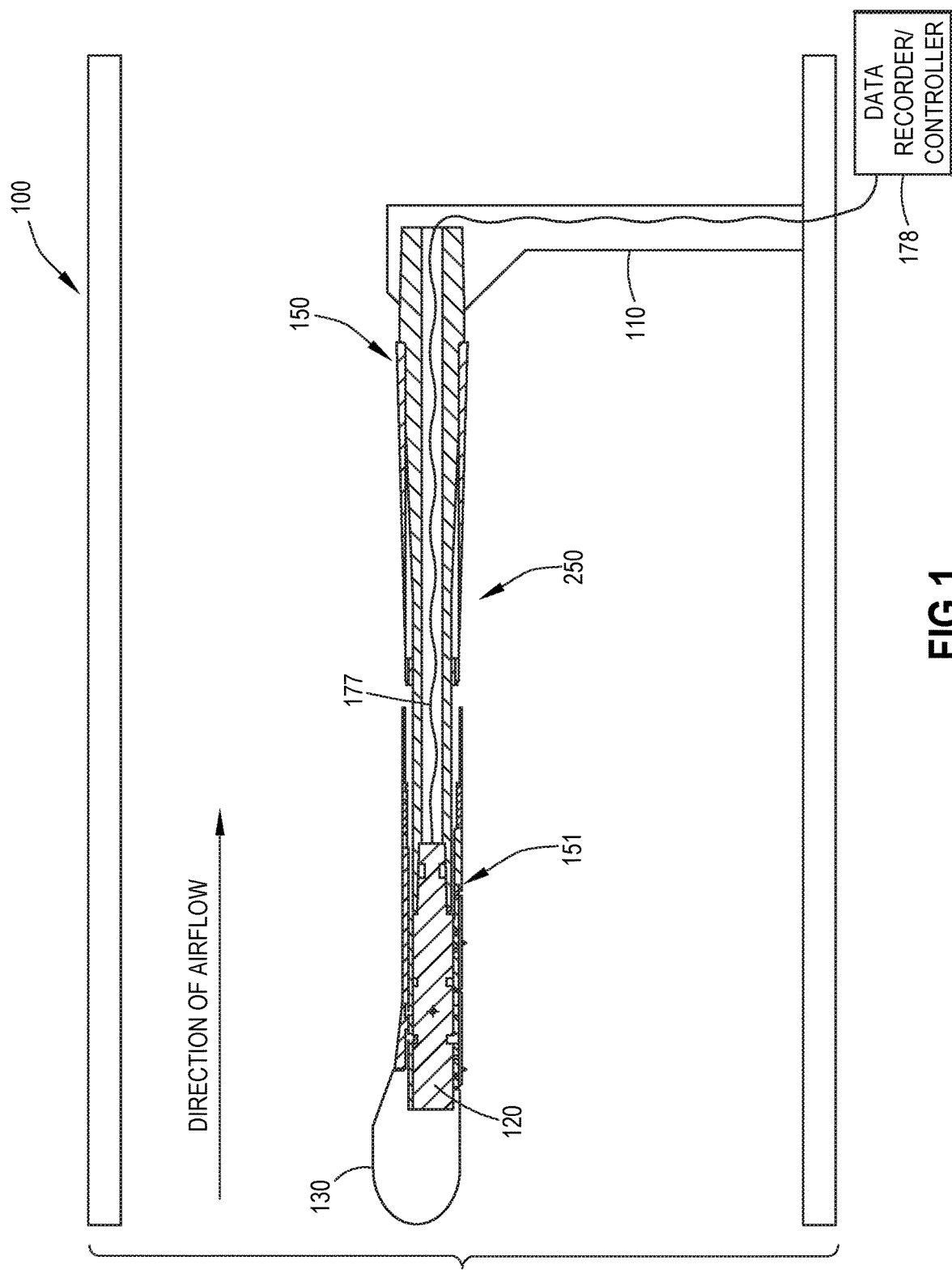
Figure 2A:
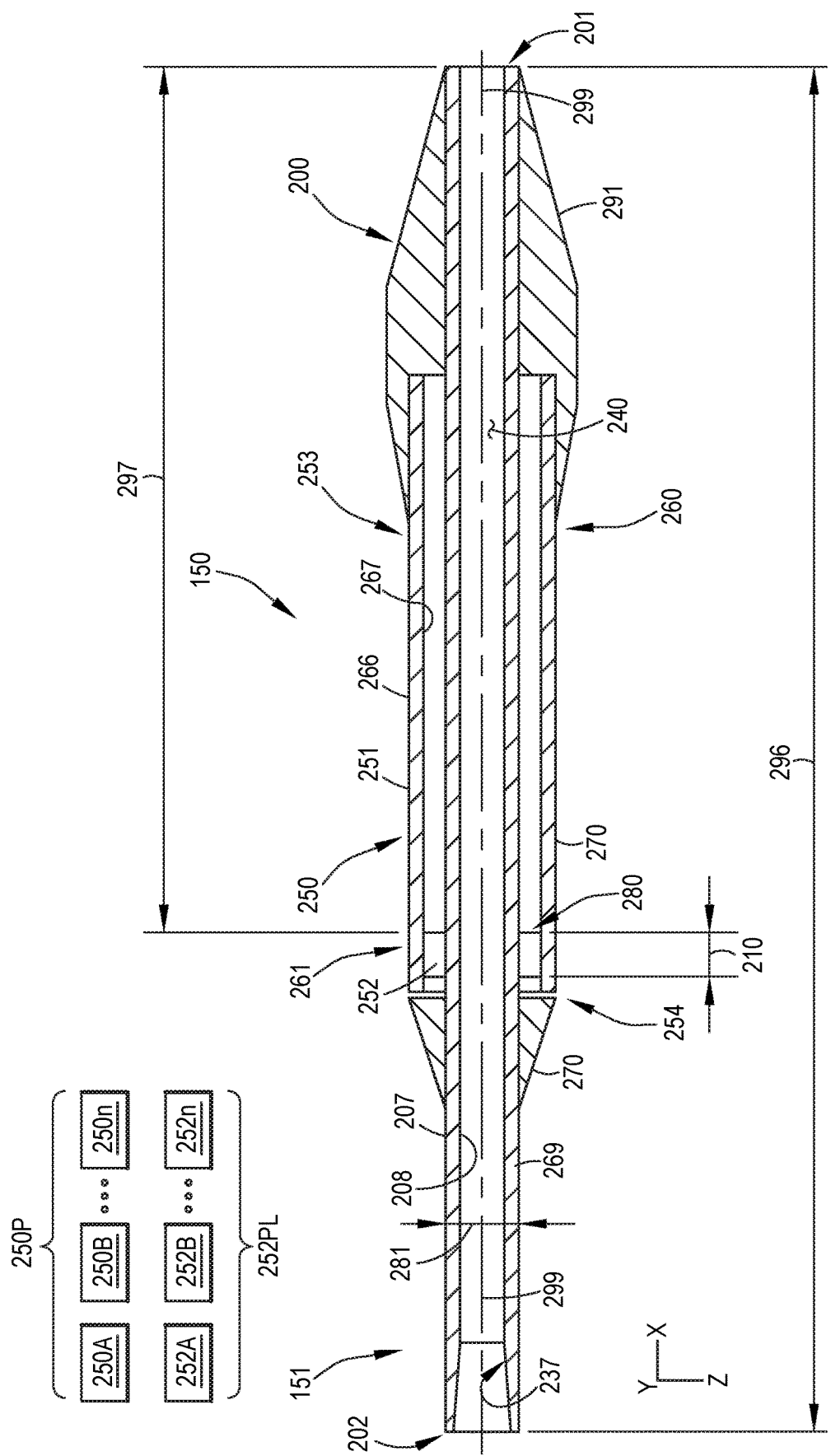
Figure 3:
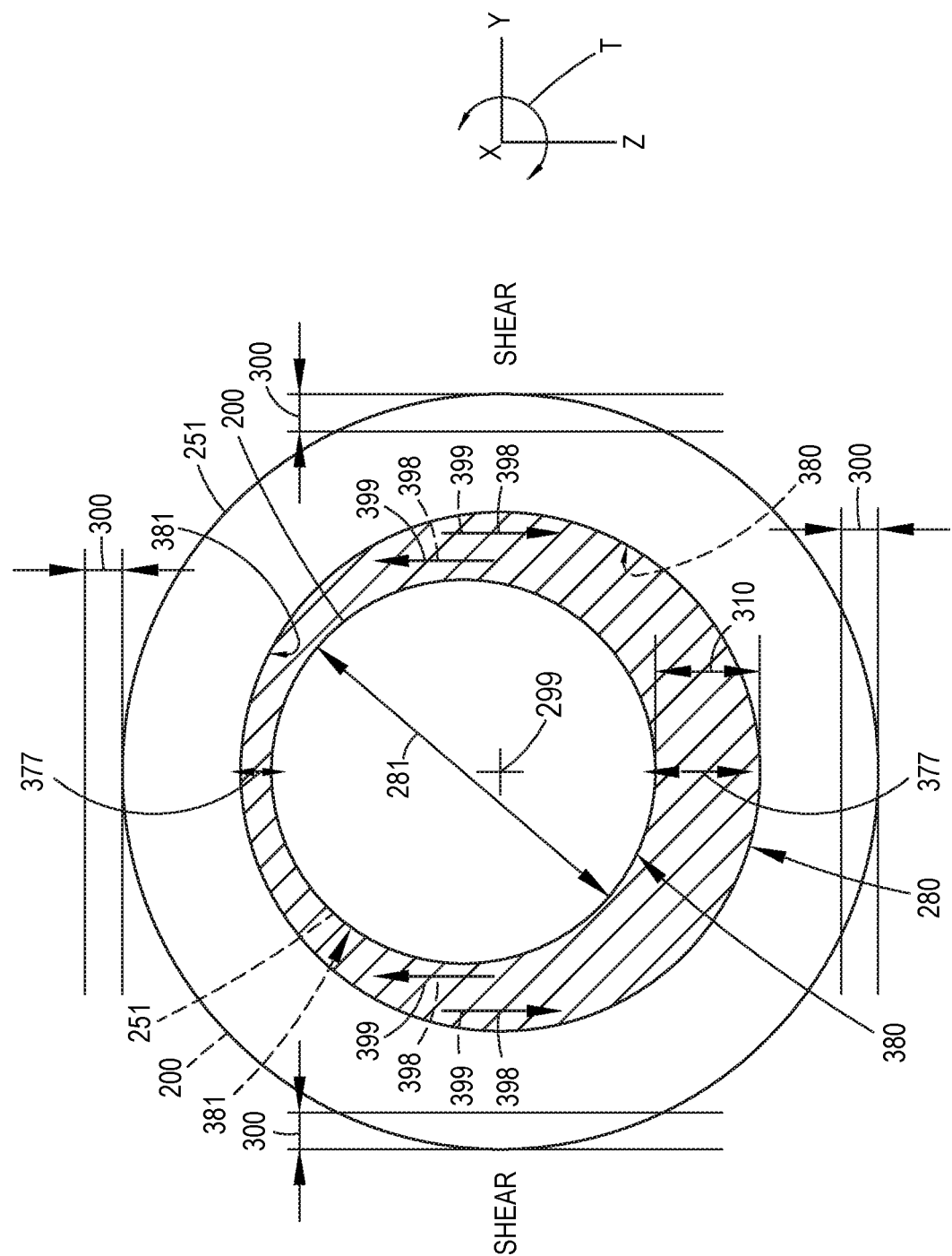
Figure 5A:
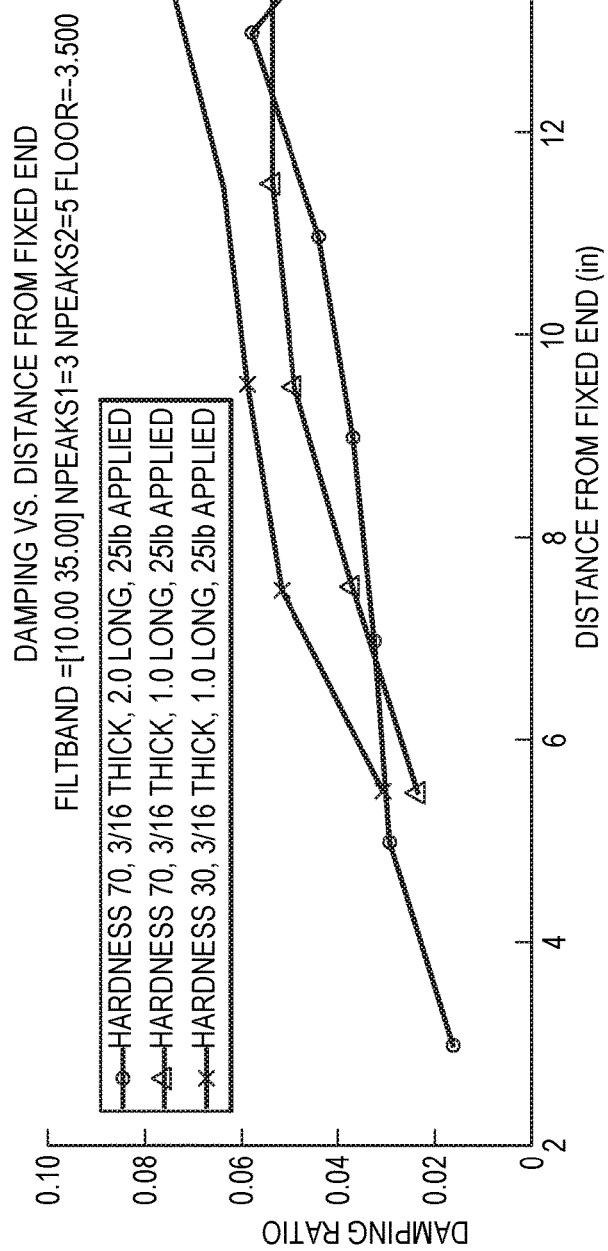
Figure 5B:
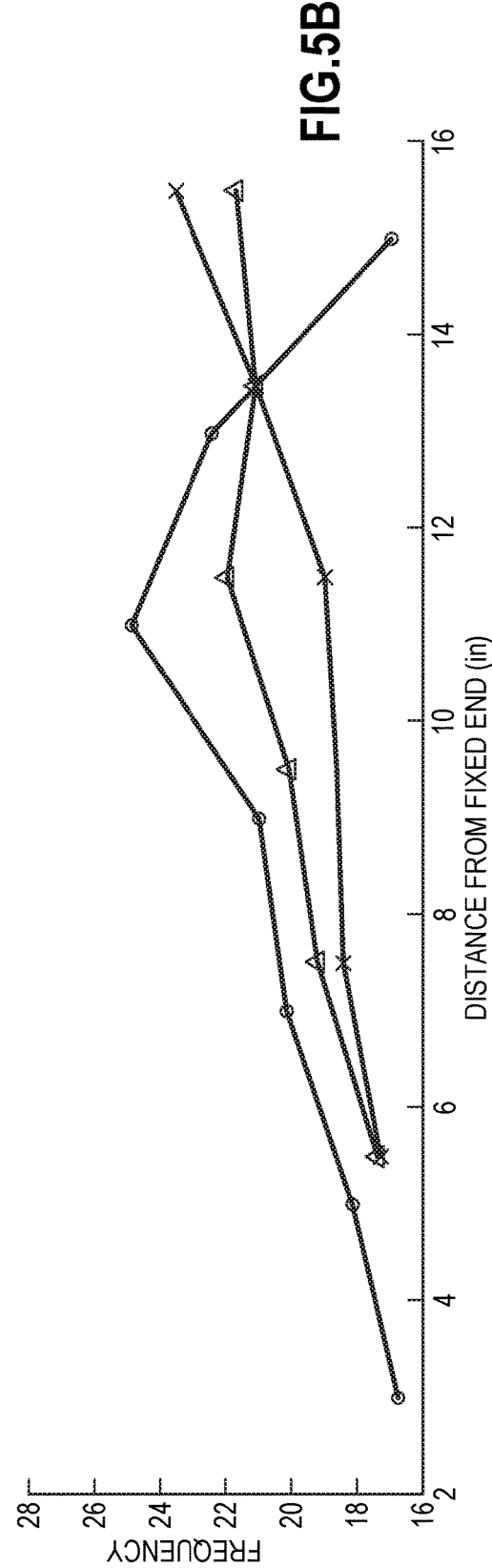
Figure 6A:
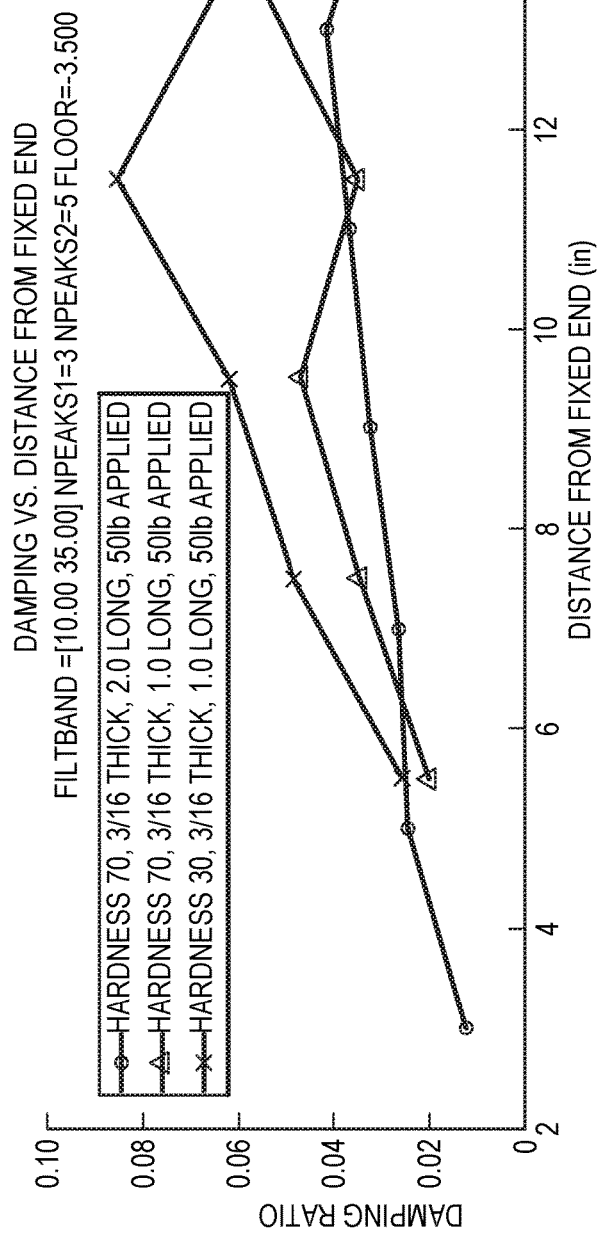
Figure 6B:
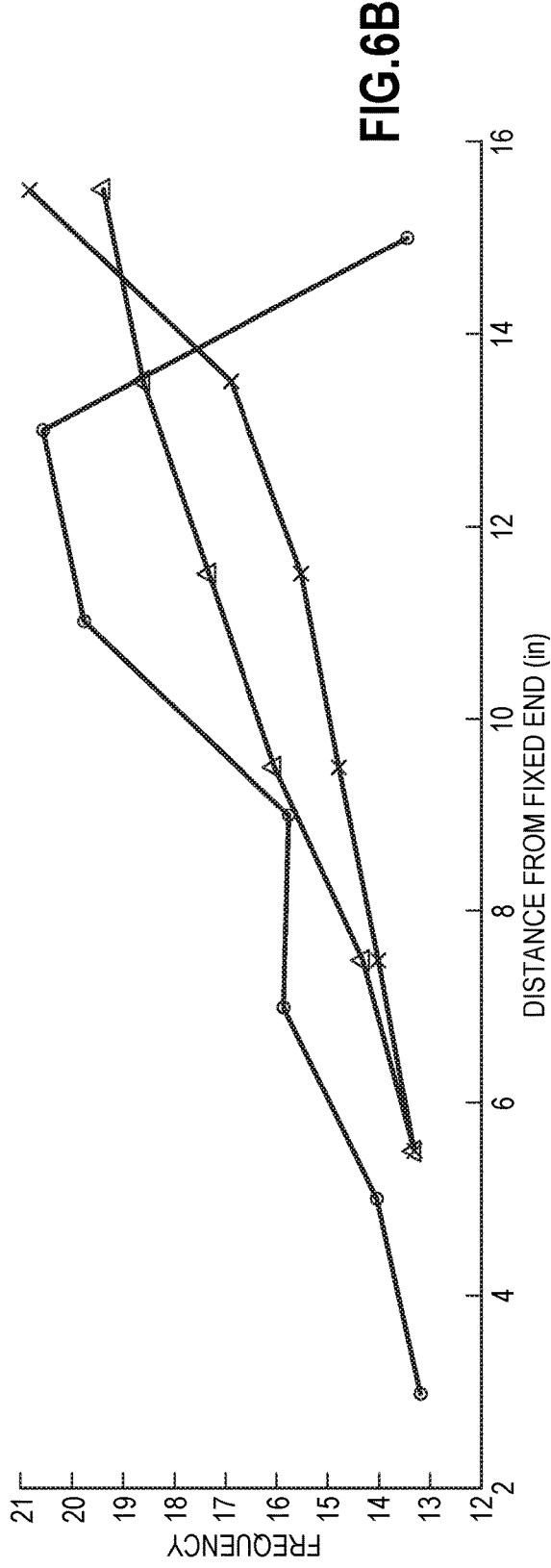
Figure 7:
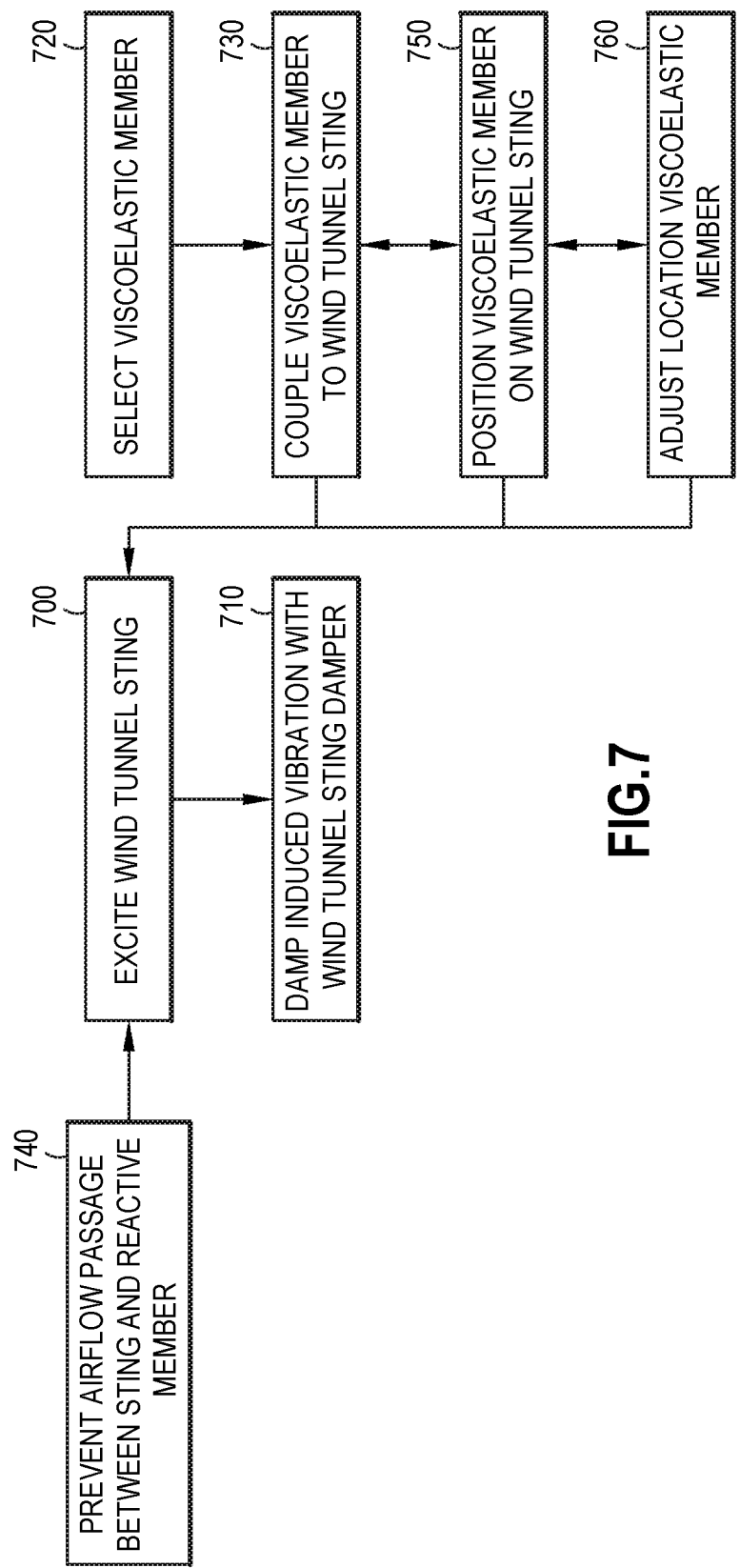

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic illustration of a portion of a wind tunnel including an aerodynamic sting in accordance with aspects of the present disclosure;

FIG. 2A is a schematic side cross-sectional illustration of a an aerodynamic sting in accordance with aspects of the present disclosure;

FIG. 2B is a schematic side cross-sectional illustration of a an aerodynamic sting in accordance with aspects of the present disclosure;

FIG. 2C is a schematic side cross-sectional illustration of a an aerodynamic sting in accordance with aspects of the present disclosure;

FIG. 3 is a schematic cross-sectional illustration of a portion of the aerodynamic stings of FIGS. 2A-2C in accordance with aspects of the present disclosure;

FIG. 4A is an exemplary graph of damping ratio plotted against a load applied to the aerodynamic sting of FIG. 2A in accordance with aspects of the present disclosure;

FIG. 4B is an exemplary graph of damping ratio plotted against a load applied to the aerodynamic sting of FIG. 2A in accordance with aspects of the present disclosure;

FIG. 5A is an exemplary graph of damping ratio plotted against viscoelastic member distance from a fixed end of the aerodynamic sting of FIG. 2A in accordance with aspects of the present disclosure;

FIG. 5B is an exemplary graph of vibrational frequency plotted against viscoelastic member distance from a fixed end of the aerodynamic sting of FIG. 2A in accordance with aspects of the present disclosure;

FIG. 6A is an exemplary graph of damping ratio plotted against viscoelastic member distance from a fixed end of the aerodynamic sting of FIG. 2A in accordance with aspects of the present disclosure;

FIG. 6B is an exemplary graph of vibrational frequency plotted against viscoelastic member distance from a fixed end of the aerodynamic sting of FIG. 2A in accordance with aspects of the present disclosure; and FIG. 7 is an exemplary flow diagram of for a method in accordance with aspects of the present disclosure.

DETAILED DESCRIPTION

Referring to FIG. 1, a portion of a wind tunnel 100 including a wind tunnel sting 150 is illustrated. The aspects of the present disclosure may provide for a reduction in dynamic loading of a wind tunnel model 130, compared to conventional vibration reducing techniques described above, that may induce unwanted vibrations during aerodynamic testing of the wind tunnel model 130, while providing for the acquisition of wind tunnel data in areas (e.g., test conditions) that include unsteady aerodynamics of the model. The wind tunnel sting 150 including a wind tunnel sting damper 250, as described herein, may be produced with only an incremental expense with respect to conventional wind tunnel stings and may retain structural damping properties for a life (e.g., several years) of the damping material without additional maintenance or cost. The damping material may be replaced without replacement of the wind tunnel sting 150 structure, which may also maintain a low operational cost of the wind tunnel sting 150. The aspects of the present disclosure may also be employed without having to house any damping structure or additional sting structure (e.g., besides a wind tunnel balance) 120 within the wind tunnel model 130.

As illustrated in FIG. 1, the wind tunnel includes a model support structure 110 to which the wind tunnel sting 150 is coupled in a conventional manner (e.g., such as with a conventional sting taper suited for the wind tunnel being used). The wind tunnel model 130 is fitted with a wind tunnel balance 120 that includes test instrumentation. The wind tunnel balance 120 is coupled to the wind tunnel sting 150 in a conventional manner (e.g., such as with a conventional balance taper suited for the wind tunnel balance being used).

Referring to FIGS. 1 and 2A-2C, the wind tunnel sting 150 includes multiple elements (i.e., a multi-element sting) and generally includes a support member 200 and a wind tunnel sting damper 250. The support member 200 has a first support-member end 201 configured for coupling with a wind tunnel 100, and a second support-member end 202 configured for coupling with a wind tunnel balance 120. For example, the first support-member end 201 includes a sting taper 291 configured for coupling with the model support structure 110. The second support-member end 202 includes a balance taper 237 to which the wind tunnel balance 120 is coupled. The wind tunnel sting damper 250 includes a reactive member 251 and a viscoelastic member 252. The viscoelastic member 252 is disposed between the reactive member 251 and the support member 200 so as to dampen, in shear, relative movement between the reactive member 251 and the support member 200. The reactive member 251 is shaped and sized to as to be coupled with a wind tunnel sting 150 (such as to the support member 200) where, the reactive member 251 extends along a longitudinal axis 299 of the wind tunnel sting 150. The reactive member 251 is sized relative to the support member 200 so as to radially compress the viscoelastic member 252 against the support member 200. The reactive member 251 is sized relative to the wind tunnel sting 150 so as to radially compress the viscoelastic member 252 against the wind tunnel sting 150 so as to generate shear forces at an interface 380 (FIG. 3) between the viscoelastic member 252 and the wind tunnel sting 150 and at another interface 381 (FIG. 3) between the viscoelastic member 252 and the reactive member 251, where the shear forces counter relative movement between the reactive member 251 and the wind tunnel sting 150 to effect vibrational damping of the wind tunnel sting 150.

The support member 200 comprises one or more of a metal and a composite so that the support member 200 is a rigid structure (i.e., is not malleable or ductile). The reactive member 251 comprises one of more of a metal and a composite so that the reactive member 251 is a rigid structure (i.e., is not malleable or ductile). The viscoelastic member 252 comprises any suitable viscoelastic polymer including but not limited to thermoset, polyether-based, polyurethane materials, an example of which is Sorbothane® available from Sorbothane, Incorporated.

The support member 200 provides structural strength for the wind tunnel sting 150, where at least a portion of the support member 200 is movable relative to the reactive member 251. In one aspect, the reactive member 251 is separate and distinct from the support member 200. For example, in the examples provided herein, the reactive member 251 includes a first reactive-member end 253 that is configured to couple with the support member 200 adjacent the first support-member end 201. The coupling between the first reactive-member end 253 and the support member 200 is a rigid coupling effected by any suitable mechanical connection including, but not limited to one or more of an interference fit, threads, pins, etc. The reactive member 251 also includes a second reactive-member end 254 that is cantilevered relative to the second support-member end 202. The second reactive-member end 254 is spaced apart from the support member 200 by the viscoelastic member 252 so as to provide independent relative movement between the support member 200 and the second reactive-member end 254 that generates shear forces at an interface 380 (FIG. 3) between the viscoelastic member 252 and the support member 200 and at another interface (381 (FIG. 3) between the viscoelastic member 252 and the second reactive-member end 254, where the shear forces counter the relative movement and effect vibrational damping of the wind tunnel sting 150. In other aspects, the reactive member 251 and the support member 200 may be formed as a monolithic one piece structure.

The support member 200 and the wind tunnel sting damper 250 are disposed relative to one another so that the support member 200 and the wind tunnel sting damper 250 are coaxial. For example, each of the support member 200 and the reactive member 251 have respective circular cross sections (see FIG. 3), although any suitable cross sections may be provided. A longitudinal axis 299 extending through the support member 200 and being disposed in a center of the circular cross section also forms a longitudinal axis that extends through and is disposed at a center of the circular cross section of the reactive member 251 (i.e., the longitudinal axis 299 is common to both the support member and the reactive member 251). The support member 200 and the wind tunnel sting 150 are also disposed relative to each other so as to be concentric with each other (e.g., the circular cross sections are concentric about the longitudinal axis 299).

Referring to FIGS. 2A-2C, the support member 200 comprises an outer surface 207 and an inner channel 240. The inner channel 240 extends between the first support-member end 201 and the second support-member end 202. The inner channel 240 provides for passage of any cables, wires, etc. (generally referred to as instrumentation 177) that extend between the wind tunnel balance 120 and a data recorder/controller 178 that records wind tunnel test data obtained by the wind tunnel balance 120. In some aspects, referring to FIGS. 2A and 2C, the reactive member 251 circumscribes the outer surface 207 of the support member 200 so as to compress the viscoelastic member 252 against the outer surface 207. In other aspects, referring to FIG. 2B, the reactive member 251 is disposed within the inner channel 240 of the support member 200 so as to compress the viscoelastic member 252 against wall(s) 208 of the inner channel 240.

Referring to FIGS. 2A, 2B, and 2C, the wind tunnel sting damper 250 comprises a cylinder 269 extending along the support member 200. Referring to FIGS. 2A and 2C, for example, the reactive member 251 is in the form of a cylinder 269 that circumscribes at least a portion of the outer surface 207 of the support member 200 (FIG. 2A) or, referring to FIG. 2B, the cylinder 269 is disposed within the inner channel 240 so that the support member 200 circumscribes the reactive member 251 (FIG. 2B). In the examples, illustrated in FIGS. 2A and 2B the cylinder 269 has a substantially constant cross-section relative to the support member 200 so that an inner surface 267 and an outer surface 266 of the reactive member 251 are substantially parallel with at least the outer surface 207 of the support member 200. In other examples, referring to FIG. 2C, the one or more of the inner surface 267 and the outer surface 266 of the reactive member 251, and the cylinder 269 formed thereby, may be tapered relative to at least the outer surface 207 of the support member 200. For example, referring to FIG. 2C, the wind tunnel sting damper 250 comprises a first damper end 260 adjacent the first support-member end 201, and a second damper end 261 adjacent the second support-member end 202. In the example shown in FIG. 2C the wind tunnel sting damper 250 has a tapered cross-section that increases from the second damper end 261 to the first damper end 260. For example, the reactive member 251 has the tapered cross-section that increases from the second damper end 261 to the first damper end 260. In one aspect, the inner surface 267 may be tapered relative to the outer surface 207 of the support member 200 between the first damper end 260 and the second damper end 261; while the outer surface 266 is substantially parallel to the outer surface 207 of the support member 200 between the first damper end 260 and the second damper end 261. In another aspect, the outer surface 266 may be tapered relative to the outer surface 207 of the support member 200, the taper extending between the first damper end 260 and the second damper end 261; while the inner surface 267 is substantially parallel to the outer surface 207 of the support member 200, the taper extending between the first damper end 260 and the second damper end 261. In other aspects, both the inner surface 267 and the outer surface 266 may be tapered, the taper extending between the first damper end 260 and the second damper end 261, relative to each other and the outer surface 207 of the support member 200.

Referring to FIG. 3, the reactive member 251 is spaced apart from the support member 200 by the viscoelastic member 252 so as to provide independent relative movement between the support member 200 and the reactive member 251 that generates shear forces 398, 399 at the interface between the viscoelastic member 252 and the support member 200 and at the interface between the viscoelastic member 252 and the reactive member 251, where the shear forces counter the relative movement and effect vibrational damping of the wind tunnel sting 150. Here the viscoelastic member 252 provides vibrational damping by way of shear strength of the viscoelastic material of the viscoelastic member 252.

In one aspect, the viscoelastic member 252 maybe bonded (in any suitable manner such as with adhesives) to one or more of the reactive member 251 and support member 200. In other aspects, the wind tunnel sting damper 250 is removable from the support member 200 so that the viscoelastic member 252 is removable and replaceable. Referring to FIG. 2A, in one aspect, the wind tunnel sting 150 comprises a plurality of wind tunnel sting dampers 250PL, each wind tunnel sting damper 250, 250A-250n (where the suffix "n" denotes a whole number indicative of an upper limit of a number of wind tunnel sting dampers being provided) of the plurality of wind tunnel sting dampers 250PL having respective damping characteristics that are different from damping characteristics of another wind tunnel sting damper 250, 250A-250n of the plurality of wind tunnel sting dampers 250PL. Each wind tunnel sting damper 250, 250A-250n of the plurality of wind tunnel sting dampers 250PL is selectably interchangeable for coupling with the support member 200. The respective damping characteristics may be a different hardness of the viscoelastic member 252, a width 210 (e.g., along the longitudinal axis 299—see FIG. 2A) of the viscoelastic member 252, a thickness 310 (see FIG. 3) of the viscoelastic member 252, or other suitable characteristic that affects vibrational damping. In one aspect, the viscoelastic member 252 may be removable from both the support member 200 and the reactive member 251 so that only the viscoelastic member 252 is replaced when changing a damping characteristic of the wind tunnel sting damper 250.

Referring to FIG. 3 (which is generic to FIGS. 2A-2C) and also to FIG. 2A (for exemplary purposes only as the viscoelastic member 252 illustrated in FIGS. 2B and 2C is similarly configured), the wind tunnel sting damper 250 radially interacts with the support member 200 so as to dampen vibration of the wind tunnel sting 150 in at least three orthogonal axes X, Y, Z. For example, the second support-member end 202 (i.e., the free, cantilevered end) of the support member is free to move independently of the second damper end 261 of the wind tunnel sting damper 250. Here the second support-member end 202 moves laterally (relative to the longitudinal axis 299) in the Y and Z directions and may also move in compression, to some extent, along the X axis (which in the coordinate system illustrated in the Figs. is coincident with the longitudinal axis 299). The second support-member end 202 may also move rotationally (i.e., in torsion) in direction T relative to the second damper end 261 of the wind tunnel sting damper 250. The movement of the second support-member end 202 in one or more of the X, Y, Z, T directions relative to the second damper end 261 generates the shear forces 398, 399 at the interface 380 between the viscoelastic member 252 and the support member 200 and at the interface 381 between the viscoelastic member 252 and the reactive member 251.

With respect to the movement of the second support-member end 202 in the Y and Z directions, a thickness 310 of the viscoelastic member 252 is greater than a peak-to-peak amplitude 300 of vibration (e.g., in the Y and Z directions and/or in the Y-Z plane) of the support member 200. FIG. 3 illustrates an example where movement of the second support-member end 202 is in the Z direction where the shear forces 398 are generated at the at the interface between the viscoelastic member 252 and the reactive member 251 and the shear forces 399 are generated at the interface between the viscoelastic member 252 and the support member 200 (it is noted that solid lead lines in FIG. 3 with respect to reference numerals 200, 251, 380, 381, 398, 399 refer to the configuration of the wind tunnel sting 150 of FIGS. 2A and 2C, whereas dashed lead lines in FIG. 3 with respect to reference numerals 200, 251, 380, 381, 398, 399 refer to the configuration of the wind tunnel sting 150 of FIG. 2B) and compression/tension forces 377 are generated in the Z direction. Here the shear strength of the viscoelastic member 252 provides damping by counteracting the shear forces 398, 399. The compression and tension strength of the viscoelastic member 252 provides additional damping of the compression/tension forces 377.

The viscoelastic member 252 of the wind tunnel sting damper 250 forms a damper band 280 that extends along a portion of the support member 200. In the aspects of FIGS. 2A and 2C the damper band 280 circumscribes the support member 200, where the reactive member 251 circumscribes the damper band 280. In the aspect, of FIG. 2B the damper band 280 circumscribes the reactive member 251, where the support member 200 circumscribes the damper band 280. In one aspect, a location of the damper band 280 is adjustable along a longitudinal axis 299 of the support member 200 so that the location of the damper band 280 may be adjusted to obtain a maximized damping effect (e.g., compared to damping provided with the damper band at other locations along the longitudinal axis 299). In other aspects the location of the damper band 280 along the longitudinal axis 299 is fixed. The viscoelastic member 252 is positioned on the support member 200 at a distance 297 from the first support-member end 201 that is about 20% to about 80% of an overall length 296 of the support member 200. The width 210 of the viscoelastic member 252 and a position of the viscoelastic member 252 along the support member 200 is a function of a diameter 281 of the support member 200. The width 210 of the viscoelastic member 252 in a direction along a longitudinal axis 299 of the support member 200 is about 2% to about 20% of the overall length 296 of the support member 200.

The wind tunnel sting damper 250, in some aspects (such as shown in FIGS. 2A and 2C), comprises an air deflector 270 disposed on the support member 200 between the second support-member end 202 and the reactive member 251. The air deflector 270 is configured to prevent airflow passage between the support member 200 and the reactive member 251.

Referring to FIGS. 4A-6B, exemplary graphs were generated from data collected using the wind tunnel sting 150 of FIG. 2A described herein (graphs for the wind tunnel stings of FIGS. 2B and 2C are substantially similar). For exemplary purposes the support member 200 of the wind tunnel sting 150 had an overall length 296 of about 24 inches (about 61 cm), an outer diameter of about 1.25 inches (about 3.2 cm), and an inner diameter of about 0.75 inches (about 2 cm). The reactive member 251 had an outer diameter of about 1.75 inches (about 4.4 cm) and an inner diameter of about 1.6 inches (about 4 cm) and a length of about 14 inches (about 35.6 cm). The exemplary graphs of FIGS. 4A-6B illustrate that the wind tunnel sting damper 250 provides about 10% modal (first mode) damping of the support member 200, such as determined by a log decrement of peak-to-peak amplitude. FIG. 4A is an exemplary graph illustrating damping ratio plotted against loads (the "applied load") applied to the second support-member end 202 of the support member 200. FIG. 4B is an exemplary graph illustrating vibrational frequency plotted against the same applied loads of FIG. 4A.

FIG. 5A is an exemplary graph illustrating the damping ratio plotted against the distance 297 of the viscoelastic member 252 from the first support-member end 201 for an applied weight of about 25 pounds. FIG. 5B is an exemplary graph illustrating vibrational frequency plotted against the same applied load of FIG. 5A. FIGS. 5A and 5B provide examples for three exemplary viscoelastic members 252 having a hardness (Rockwell hardness) of about 30 and about 70 and lengths of about 1 inch (about 2.5 cm) and about 2 inches (about 5 cm).

FIG. 6A is an exemplary graph illustrating the damping ratio plotted against the distance 297 of the viscoelastic member 252 from the first support-member end 201 for an applied weight of about 50 pounds. FIG. 5B is an exemplary graph illustrating vibrational frequency plotted against the same applied load of FIG. 5A. FIGS. 5A and 5B provide examples for three exemplary viscoelastic members 252 having a hardness (Rockwell hardness) of about 30 and about 70 and lengths of about 1 inch (about 2.5 cm) and about 2 inches (about 5 cm).

The wind tunnel sting damper 250 may be retrofit to existing (e.g., conventional) wind tunnel stings. Whether retrofit to existing stings or provided with the wind tunnel sting 150 described herein the aspects of the present disclosure provide a cost effect and simple solution (compared to the conventional vibration mitigation techniques noted herein) for mitigating unwanted induced vibrations of wind tunnel stings. The wind tunnel sting 150 described herein may be easily fabricated (e.g., without exotic material bonding or manufacturing techniques). The wind tunnel sting 150 in accordance with the aspects of the present disclosure also provide operation without concern of composite delamination (such as when different materials are bonded together to form a support structure).

Referring to FIGS. 1-3 and 7, a method of dampening vibrations of the wind tunnel sting 150 will be described. The method includes exciting the wind tunnel sting 150 (FIG. 7, Block 700) so as to induce vibration of a free end 151 of the wind tunnel sting 150. The induced vibration is damped with the wind tunnel sting damper 250 (FIG. 7, Block 710) described above, where the reactive member 251 radially compresses the viscoelastic member 252 against the wind tunnel sting 150 so as to generate the shear forces 398, 399 at an interface 380 between the viscoelastic member 252 and the wind tunnel sting 150 and at another interface 381 between the viscoelastic member 252 and the reactive member 251. The shear forces 398, 399 are generated within the viscoelastic member 252 to counter relative movement between the reactive member 251 and the wind tunnel sting 150 to effect vibrational damping of the wind tunnel sting

150. In some aspects (FIGS. 2A and 2C), the reactive member 251 compresses the viscoelastic member 252 radially inward against an outer surface 207 of the wind tunnel sting 150. In another aspect (FIG. 2B), the reactive member 251 compresses the viscoelastic member 252 radially outward against an inner channel 240 of the wind tunnel sting 150. The reactive member 251 is spaced apart from the wind tunnel sting 150 by the viscoelastic member 252 so as to provide relative movement between the wind tunnel sting 150 and the reactive member 251.

In some aspect, the method further comprises selecting a viscoelastic member 252, 252A-252n (or selecting a wind tunnel sting damper 250, 250A-250n) from a plurality of viscoelastic members 252PL (or from a plurality of wind tunnel sting dampers 250PL) (FIG. 7, Block 720). Each viscoelastic member 252, 252A-252n of the plurality of viscoelastic members 252PL having respective damping characteristics (such as those described above) that are different from damping characteristics of other viscoelastic member 252, 252A-252n of the plurality of viscoelastic members 252PL. Each viscoelastic member 252, 252A-252n of the plurality of viscoelastic members 252PL is selectably interchangeable for coupling with the wind tunnel sting 150. The viscoelastic member 252 (or the wind tunnel sting damper 250) is coupled to the wind tunnel sting 150 (FIG. 7, Block 730). The reactive member 251 and the viscoelastic member 252 radially interact with the wind tunnel sting 150 so as to dampen vibration of the wind tunnel sting 150 in at least three orthogonal axes/directions X, Y, Z and, in some aspects in a torsional T direction.

In some aspects (FIGS. 2A and 2C), the method further comprises preventing airflow passage between the wind tunnel sting 150 and the reactive member 251 (FIG. 7, Block 740) with an air deflector 270 disposed on the wind tunnel sting 150 upstream from the reactive member 251 relative to a direction of air flowing over the wind tunnel sting 150.

In some aspects, the method further comprises adjusting a location of the viscoelastic member 252 along a longitudinal axis 299 of the wind tunnel sting 150 (FIG. 7, Block 760). The method further comprises positioning the viscoelastic member 252 on the wind tunnel sting 150 at a distance 297 from an end of the wind tunnel sting 150, at which a sting taper 291 is located, that is about 20% to about 80% of an overall length 296 of the wind tunnel sting 150 (FIG. 7, Block 750).

The following are provided in accordance with the aspects of the present disclosure:

A1. A wind tunnel sting comprising:
a support member having: a first support-member end configured for coupling with a wind tunnel, and a second support-member end configured for coupling with a balance; and
a wind tunnel sting damper having: a reactive member, and a viscoelastic member disposed between the reactive member and the support member;
wherein, the reactive member is sized relative to the support member so as to radially compress the viscoelastic member against the support member.

A2. The wind tunnel sting of paragraph A1, wherein:
the support member further comprises an outer surface; and
the reactive member circumscribes the outer surface of the support member so as to compress the viscoelastic member against the outer surface.

A3. The wind tunnel sting of paragraph A1, wherein:
the support member further comprises an inner channel; and
the reactive member is disposed within the inner channel of the support member so as to compress the viscoelastic member against the inner channel.

A4. The wind tunnel sting of paragraph A1, wherein the reactive member is separate and distinct from the support member, the reactive member being spaced apart from the support member by the viscoelastic member so as to provide relative movement between the support member and the reactive member that generates shear forces at an interface between the viscoelastic member and the support member and at another interface between the viscoelastic member and the reactive member, where the shear forces counter the relative movement and effect vibrational damping of the wind tunnel sting.

A5. The wind tunnel sting of paragraph A1, wherein the reactive member comprises:
a first reactive-member end configured to couple with the support member adjacent the first support-member end; and
a second reactive-member end that is cantilevered relative to the second support-member end, the second reactive-member end being spaced apart from the support member by the viscoelastic member so as to provide relative movement between the support member and the second reactive-member end that generates shear forces at an interface between the viscoelastic member and the support member and at another interface between the viscoelastic member and the second reactive-member end, where the shear forces counter the relative movement and effect vibrational damping of the wind tunnel sting.

A6. The wind tunnel sting of paragraph A1, wherein the wind tunnel sting damper is removable from the support member.

A7. The wind tunnel sting of paragraph A1, wherein the wind tunnel sting comprises a plurality of wind tunnel sting dampers, each of the plurality of wind tunnel sting dampers having respective damping characteristics that are different from damping characteristics of other ones of the plurality of wind tunnel sting dampers, where each of the plurality of wind tunnel sting dampers are selectably interchangeable for coupling with the support member.

A8. The wind tunnel sting of paragraph A1, wherein the wind tunnel sting damper comprises:
a first damper end adjacent the first support-member end; and
a second damper end adjacent the second support-member end;
wherein the wind tunnel sting damper has a tapered cross-section that increases from the second damper end to the first damper end.

A9. The wind tunnel sting of paragraph A1, wherein the wind tunnel sting damper comprises a cylinder extending along the support member.

A10. The wind tunnel sting of paragraph A1, wherein the support member and the wind tunnel sting damper are coaxial.

A11. The wind tunnel sting of paragraph A1, wherein the support member and the wind tunnel sting are concentric with each other.

A12. The wind tunnel sting of paragraph A1, wherein the support member comprises one or more of a metal and a composite.

A13. The wind tunnel sting of paragraph A1, wherein the reactive member comprises one or more of a metal and a composite.

A14. The wind tunnel sting of paragraph A1, wherein a thickness of the viscoelastic member is greater than a peak-to-peak amplitude of vibration of the support member.

A15. The wind tunnel sting of paragraph A1, wherein the wind tunnel sting damper radially interacts with the support member so as to dampen vibration of the wind tunnel sting in at least three orthogonal axes.

A16. The wind tunnel sting of paragraph A1, wherein the wind tunnel sting damper comprises an air deflector (270) disposed on the support member between the second support-member end and the reactive member, the air deflector being configured to prevent airflow passage between the support member and the reactive member.

A17. The wind tunnel sting of paragraph A1, wherein the viscoelastic member of the wind tunnel sting damper forms a damper band that extends along a portion of the support member.

A18. The wind tunnel sting of paragraph A17, where a location of the damper band is adjustable along a longitudinal axis of the support member.

A19. The wind tunnel sting of paragraph A1, wherein a width of the viscoelastic member and a position of the viscoelastic member along the support member is a function of a diameter of the support member.

A20. The wind tunnel sting of paragraph A1, wherein a width of the viscoelastic member in a direction along a longitudinal axis of the support member is about 2% to about 20% of an overall length of the support member.

A21. The wind tunnel sting of paragraph A1, wherein the viscoelastic member is positioned on the support member at a distance from the first support-member end that is about 20% to about 80% of an overall length of the support member.

A22. The wind tunnel sting of paragraph A1, wherein the wind tunnel sting damper provides about 10% modal damping of the support member.

B1. A wind tunnel sting damper comprising:
a reactive member that is shaped and sized to as to be coupled with a wind tunnel sting where, the reactive member extends along a longitudinal axis of the wind tunnel sting, and
a viscoelastic member disposed between the reactive member and the wind tunnel sting;
wherein, the reactive member is sized relative to the wind tunnel sting so as to radially compress the viscoelastic member against the wind tunnel sting so as to generate shear forces at an interface between the viscoelastic member and the wind tunnel sting and at another interface between the viscoelastic member and the reactive member, where the shear forces counter relative movement between the reactive member and the wind tunnel sting to effect vibrational damping of the wind tunnel sting.

B2. The wind tunnel sting damper of paragraph B1, wherein the reactive member circumscribes an outer surface of the wind tunnel sting so as to compress the viscoelastic member against the outer surface.

B3. The wind tunnel sting damper of paragraph B1, wherein the reactive member is disposed within an inner channel of the wind tunnel sting so as to compress the viscoelastic member against the inner channel.

B4. The wind tunnel sting damper of paragraph B1, wherein the reactive member is spaced apart from the wind tunnel sting by the viscoelastic member so as to provide the relative movement between the wind tunnel sting and the reactive member.

B5. The wind tunnel sting damper of paragraph B1, wherein the reactive member comprises:
a first reactive-member end configured to couple with the wind tunnel sting adjacent a sting taper of the wind tunnel sting; and
a second reactive-member end that is cantilevered relative to the wind tunnel sting, the second reactive-member end being spaced apart from the wind tunnel sting by the viscoelastic member so as to provide the relative movement between the wind tunnel sting and the second reactive-member end.

B6. The wind tunnel sting damper of paragraph B1, wherein the wind tunnel sting damper is removable from the wind tunnel sting.

B7. The wind tunnel sting damper of paragraph B1, wherein the wind tunnel sting damper comprises a plurality of viscoelastic members, each of the plurality of viscoelastic members having respective damping characteristics that are different from damping characteristics of other ones of the plurality of viscoelastic members, where each of the plurality of viscoelastic members are selectably interchangeable for coupling with the wind tunnel sting.

B8. The wind tunnel sting damper of paragraph B1, wherein the reactive member comprises:
a first damper end configured for coupling with the wind tunnel sting; and
a second damper end;
wherein the reactive member has a tapered cross-section that increases from the second damper end to the first damper end.

B9. The wind tunnel sting damper of paragraph B1, wherein the reactive member comprises a cylinder extending along the wind tunnel sting.

B10. The wind tunnel sting damper of paragraph B1, wherein the reactive member is configured so as to be coaxial with the wind tunnel sting.

B11. The wind tunnel sting damper of paragraph B1, wherein the reactive member is configured so as to be concentric with the wind tunnel sting.

B12. The wind tunnel sting damper of paragraph B1, wherein the reactive member comprises one or more of a metal and a composite.

B13. The wind tunnel sting damper of paragraph B1, wherein a thickness of the viscoelastic member is greater than a peak-to-peak amplitude of vibration of the wind tunnel sting.

B14. The wind tunnel sting damper of paragraph B1, wherein the reactive member and the viscoelastic member radially interact with the wind tunnel sting so as to dampen vibration of the wind tunnel sting in at least three orthogonal axes.

B15. The wind tunnel sting damper of paragraph B1, further comprising an air deflector disposed on the wind tunnel sting upstream from the reactive member relative to a direction of air flowing over the wind tunnel sting, the air deflector being configured to prevent airflow passage between the wind tunnel sting and the reactive member.

B16. The wind tunnel sting damper of paragraph B1, wherein the viscoelastic member forms a damper band that extends along a portion of the wind tunnel sting.

B17. The wind tunnel sting damper of paragraph B16, where a location of the damper band is adjustable along a longitudinal axis of the wind tunnel sting.

B18. The wind tunnel sting damper of paragraph B1, wherein a width of the viscoelastic member and a position of the viscoelastic member along the wind tunnel sting is a function of a diameter of the wind tunnel sting.

B19. The wind tunnel sting damper of paragraph B1, wherein a width of the viscoelastic member in a direction along a longitudinal axis of the wind tunnel sting is about 2% to about 20% of an overall length of the wind tunnel sting.

B20. The wind tunnel sting damper of paragraph B1, wherein the viscoelastic member is positioned on the wind tunnel sting at a distance from an end of the wind tunnel sting, at which a sting taper is located, that is about 20% to about 80% of an overall length of the wind tunnel sting.

B21. The wind tunnel sting damper of paragraph B1, wherein the wind tunnel sting damper provides about 10% modal damping of the wind tunnel sting.

C1. A method of dampening vibrations of a wind tunnel sting, the method comprising:

exciting the wind tunnel sting so as to induce vibration of a free end of the wind tunnel sting;

damping the induced vibration with a wind tunnel sting damper that includes a reactive member that is shaped and sized to as to be coupled with a wind tunnel sting where, the reactive member extends along a longitudinal axis of the wind tunnel sting, and a viscoelastic member disposed between the reactive member and the wind tunnel sting;

wherein, the reactive member radially compresses the viscoelastic member against the wind tunnel sting so as to generate shear forces at an interface between the viscoelastic member and the wind tunnel sting and at another interface between the viscoelastic member and the reactive member, where the shear forces counter relative movement between the reactive member and the wind tunnel sting to effect vibrational damping of the wind tunnel sting.

C2. The method of paragraph C1, wherein the reactive member compresses the viscoelastic member radially inward against an outer surface of the wind tunnel sting.

C3. The method of paragraph C1, wherein the reactive member compresses the viscoelastic member radially outward against an inner channel of the wind tunnel sting.

C4. The method of paragraph C1, wherein the reactive member is spaced apart from the wind tunnel sting by the viscoelastic member so as to provide relative movement between the wind tunnel sting and the reactive member.

C5. The method of paragraph C1, further comprising:

selecting a viscoelastic member from a plurality of viscoelastic members, each of the plurality of viscoelastic members having respective damping characteristics that are different from damping characteristics of other ones of the plurality of viscoelastic members, where each of the plurality of viscoelastic members are selectably interchangeable for coupling with the wind tunnel sting; and coupling the viscoelastic member to the wind tunnel sting.

C6. The method of paragraph C1, wherein the reactive member and the viscoelastic member radially interact with the wind tunnel sting so as to dampen vibration of the wind tunnel sting in at least three orthogonal axes.

C7. The method of paragraph C1, further comprising preventing airflow passage between the wind tunnel sting and the reactive member with an air deflector disposed on the wind tunnel sting upstream from the reactive member relative to a direction of air flowing over the wind tunnel sting.

C8. The method of paragraph C1, further comprising adjusting a location of the viscoelastic member along a longitudinal axis of the wind tunnel sting.

C9. The method of paragraph C1, further comprising positioning the viscoelastic member is on the wind tunnel sting at a distance from an end of the wind tunnel sting, at which a sting taper is located, that is about 20% to about 80% of an overall length of the wind tunnel sting.

C10. The method of paragraph C1, wherein the wind tunnel sting damper provides about 10% modal damping of the wind tunnel sting.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 7, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 7 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts are described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A wind tunnel sting comprising:
    a support member having:
        a first support-member end configured for coupling with a wind tunnel, and
        a second support-member end configured for coupling with a balance; and
    a wind tunnel sting damper having:
        a reactive member, and
        a viscoelastic member disposed between the reactive member and the support member;
    wherein, the reactive member is sized relative to the support member so as to radially compress the viscoelastic member against the support member.

2. The wind tunnel sting of claim 1, wherein:
    the support member further comprises an outer surface; and
    the reactive member circumscribes the outer surface of the support member so as to compress the viscoelastic member against the outer surface.

3. The wind tunnel sting of claim 1, wherein:
    the support member further comprises an inner channel; and
    the reactive member is disposed within the inner channel of the support member so as to compress the viscoelastic member against the inner channel.

4. The wind tunnel sting of claim 1, wherein the reactive member is separate and distinct from the support member, the reactive member being spaced apart from the support member by the viscoelastic member so as to provide relative movement between the support member and the reactive member that generates shear forces at an interface between the viscoelastic member and the support member and at another interface between the viscoelastic member and the reactive member, where the shear forces counter the relative movement and effect vibrational damping of the wind tunnel sting.

5. The wind tunnel sting of claim 1, wherein the reactive member comprises:
    a first reactive-member end configured to couple with the support member adjacent the first support-member end; and
    a second reactive-member end that is cantilevered relative to the second support-member end, the second reactive-member end being spaced apart from the support member by the viscoelastic member so as to provide relative movement between the support member and the second reactive-member end that generates shear forces at an interface between the viscoelastic member and the support member and at another interface between the viscoelastic member and the second reactive-member end, where the shear forces counter the relative movement and effect vibrational damping of the wind tunnel sting.

6. The wind tunnel sting of claim 1, wherein the wind tunnel sting damper is removable from the support member.

7. The wind tunnel sting of claim 1, wherein a thickness of the viscoelastic member is greater than a peak-to-peak amplitude of vibration of the support member.

8. The wind tunnel sting of claim 1, wherein the wind tunnel sting damper radially interacts with the support member so as to dampen vibration of the wind tunnel sting in at least three orthogonal axes.

9. The wind tunnel sting of claim 1, wherein a width of the viscoelastic member in a direction along a longitudinal axis of the support member is about 2% to about 20% of an overall length of the support member.

10. The wind tunnel sting of claim 1, wherein the viscoelastic member is positioned on the support member at a distance from the first support-member end that is about 20% to about 80% of an overall length of the support member.

11. A wind tunnel sting damper comprising:
a reactive member that is shaped and sized to as to be coupled with a wind tunnel sting where, the reactive member extends along a longitudinal axis of the wind tunnel sting, and
a viscoelastic member disposed between the reactive member and the wind tunnel sting;
wherein, the reactive member is sized relative to the wind tunnel sting so as to radially compress the viscoelastic member against the wind tunnel sting so as to generate shear forces at an interface between the viscoelastic member and the wind tunnel sting and at another interface between the viscoelastic member and the reactive member, where the shear forces counter relative movement between the reactive member and the wind tunnel sting to effect vibrational damping of the wind tunnel sting.

12. The wind tunnel sting damper of claim 11, wherein the reactive member circumscribes an outer surface of the wind tunnel sting so as to compress the viscoelastic member against the outer surface.

13. The wind tunnel sting damper of claim 11, wherein the reactive member is disposed within an inner channel of the wind tunnel sting so as to compress the viscoelastic member against the inner channel.

14. The wind tunnel sting damper of claim 11, wherein the reactive member is spaced apart from the wind tunnel sting by the viscoelastic member so as to provide the relative movement between the wind tunnel sting and the reactive member.

15. The wind tunnel sting damper of claim 11, wherein the reactive member is configured so as to be coaxial with the wind tunnel sting.

16. The wind tunnel sting damper of claim 11, wherein the reactive member is configured so as to be concentric with the wind tunnel sting.

17. A method of dampening vibrations of a wind tunnel sting, the method comprising:
exciting the wind tunnel sting so as to induce vibration of a free end of the wind tunnel sting;
damping the induced vibration with a wind tunnel sting damper that includes
a reactive member that is shaped and sized to as to be coupled with a wind tunnel sting where, the reactive member extends along a longitudinal axis of the wind tunnel sting, and
a viscoelastic member disposed between the reactive member and the wind tunnel sting;
wherein, the reactive member radially compresses the viscoelastic member against the wind tunnel sting so as to generate shear forces at an interface between the viscoelastic member and the wind tunnel sting and at another interface between the viscoelastic member and the reactive member, where the shear forces counter relative movement between the reactive member and the wind tunnel sting to effect vibrational damping of the wind tunnel sting.

18. The method of claim 17, wherein the reactive member compresses the viscoelastic member radially inward against an outer surface of the wind tunnel sting.

19. The method of claim 17, wherein the reactive member compresses the viscoelastic member radially outward against an inner channel of the wind tunnel sting.

20. The method of claim 17, wherein the reactive member is spaced apart from the wind tunnel sting by the viscoelastic member so as to provide relative movement between the wind tunnel sting and the reactive member.

* * * * *